United States Patent
Arrigoni et al.

(10) Patent No.: US 11,308,406 B2
(45) Date of Patent: Apr. 19, 2022

(54) METHOD OF OPERATING NEURAL NETWORKS, CORRESPONDING NETWORK, APPARATUS AND COMPUTER PROGRAM PRODUCT

(71) Applicant: STMICROELECTRONICS S.r.l., Agrate Brianza (IT)

(72) Inventors: Valentina Arrigoni, Rho (IT); Giuseppe Desoli, San Fermo Della Battaglia (IT); Beatrice Rossi, Milan (IT); Pasqualina Fragneto, Burago di Molgora (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 1125 days.

(21) Appl. No.: 15/877,138

(22) Filed: Jan. 22, 2018

(65) Prior Publication Data

US 2018/0218275 A1    Aug. 2, 2018

(30) Foreign Application Priority Data

Jan. 27, 2017    (IT) .................. 102017000008949

(51) Int. Cl.
*G06N 5/04*    (2006.01)
*G06F 7/72*    (2006.01)
(Continued)

(52) U.S. Cl.
CPC ............. *G06N 5/046* (2013.01); *G06F 7/729* (2013.01); *G06F 17/16* (2013.01); *G06N 3/0454* (2013.01); *G06N 7/005* (2013.01); *G06N 7/023* (2013.01)

(58) Field of Classification Search
CPC ...... G06N 5/046; G06N 3/0454; G06N 7/005; G06N 7/023; G06F 7/729; G06F 17/16
(Continued)

(56) References Cited

U.S. PATENT DOCUMENTS

| 5,008,668 A | 4/1991 | Takayama et al. |
| 5,117,383 A * | 5/1992 | Fujita ..................... G06F 7/729 |
| | | 708/491 |

(Continued)

FOREIGN PATENT DOCUMENTS

| CN | 1119308 A | 3/1996 |
| CN | 101606320 A | 12/2009 |

(Continued)

OTHER PUBLICATIONS

Xiaolan et al., "RNS scaler for the 4-moduli set RNS," *Application of Electronic Technique* 41(8), 2015 (with English abstract).

(Continued)

*Primary Examiner* — Tsu-Chang Lee
(74) *Attorney, Agent, or Firm* — Seed IP Law Group LLP

(57) ABSTRACT

A method of operating neural networks such as convolutional neural networks including, e.g., an input layer, an output layer and at least one intermediate layer between the input layer and the output layer, with the network layers including operating circuits performing arithmetic operations on input data to provide output data. The method includes: selecting a set of operating circuits in the network layers, performing arithmetic operations in operating circuits in the selected set of operating circuits by performing Residue Number System or RNS operations on RNS-converted input data by obtaining RNS output data in the Residue Number System, backward converting from the Residue Number System the RNS output data resulting from the RNS operations.

28 Claims, 10 Drawing Sheets

(51) Int. Cl.
*G06N 3/04* (2006.01)
*G06F 17/16* (2006.01)
*G06N 7/00* (2006.01)
*G06N 7/02* (2006.01)

(58) Field of Classification Search
USPC .......................................................... 706/46
See application file for complete search history.

(56) References Cited

U.S. PATENT DOCUMENTS

| | | | |
|---|---|---|---|
| 6,601,049 B1 | 7/2003 | Cooper | |
| 8,711,926 B2 | 4/2014 | Malayath et al. | |
| 10,228,911 B2 | 3/2019 | Henry et al. | |
| 2006/0184600 A1* | 8/2006 | Maruo | G06F 7/729 708/491 |
| 2012/0239603 A1* | 9/2012 | Raestik | G05B 15/02 706/21 |

FOREIGN PATENT DOCUMENTS

| | | |
|---|---|---|
| CN | 102043760 A | 5/2011 |
| CN | 106203622 A | 12/2016 |
| CN | 106355246 A | 1/2017 |
| EP | 0 795 819 A1 | 9/1997 |
| JP | 1-99325 A | 4/1989 |
| JP | 7-271748 A | 10/1995 |
| RU | 2 584 495 C1 | 5/2016 |
| WO | 2014/149070 A1 | 9/2014 |

OTHER PUBLICATIONS

Courbariaux et al., "Training Deep Neural Networks with Low Precision Multiplications," arXiv:1412.7024v5, 2015, 10 pages.
Italian Search Report and Written Opinion, dated Oct. 12, 2017, for Italian Application No. 201700008949, 10 pages.
Kong et al., "Residue number system scaling schemes," *Proceedings of SPIE* 5649:525-536, SPIE, Bellingham, Washington, 2005.
Koren, *Computer Arithmetic Algorithms*, A. K. Peters Press, 2002, pp. 264-265.
Krizhevsky et al., "ImageNet Classification with Deep Convolutional Neural Networks," in F. Pereira et al. (ed.), *Advances in Neural Information Processing Systems* 25, 2012, pp. 1097-1105. (9 pages).
Miyashita et al., "Convolutional Neural Networks using Logarithmic Data Representation," arXiv:1603.01025v2, 2016, 10 pages.
Mohan, *Residue Number Systems: Algorithms and Architectures*, Springer, New York, New York, 2002.
Nakahara et al., "A Deep Convolutional Neural Network Based on Nested Residue Number System," *25th International Conference on Field Programmable Logic and Applications (FPL)*, IEEE, 2015, pp. 1-6.
Rose, *A Course in Number Theory*, Oxford University Press, 1995, pp. 36-37.
Szegedy et al., "Going Deeper with Convolutions," *Proceedings of the IEEE Conference on Computer Vision and Pattern Recognition*, IEEE, 2015, pp. 1-9.
Alia et al., "NEUROM: a ROM based RNS digital neuron," *Neural Networks* 18(2): 179-189, 2005.

* cited by examiner

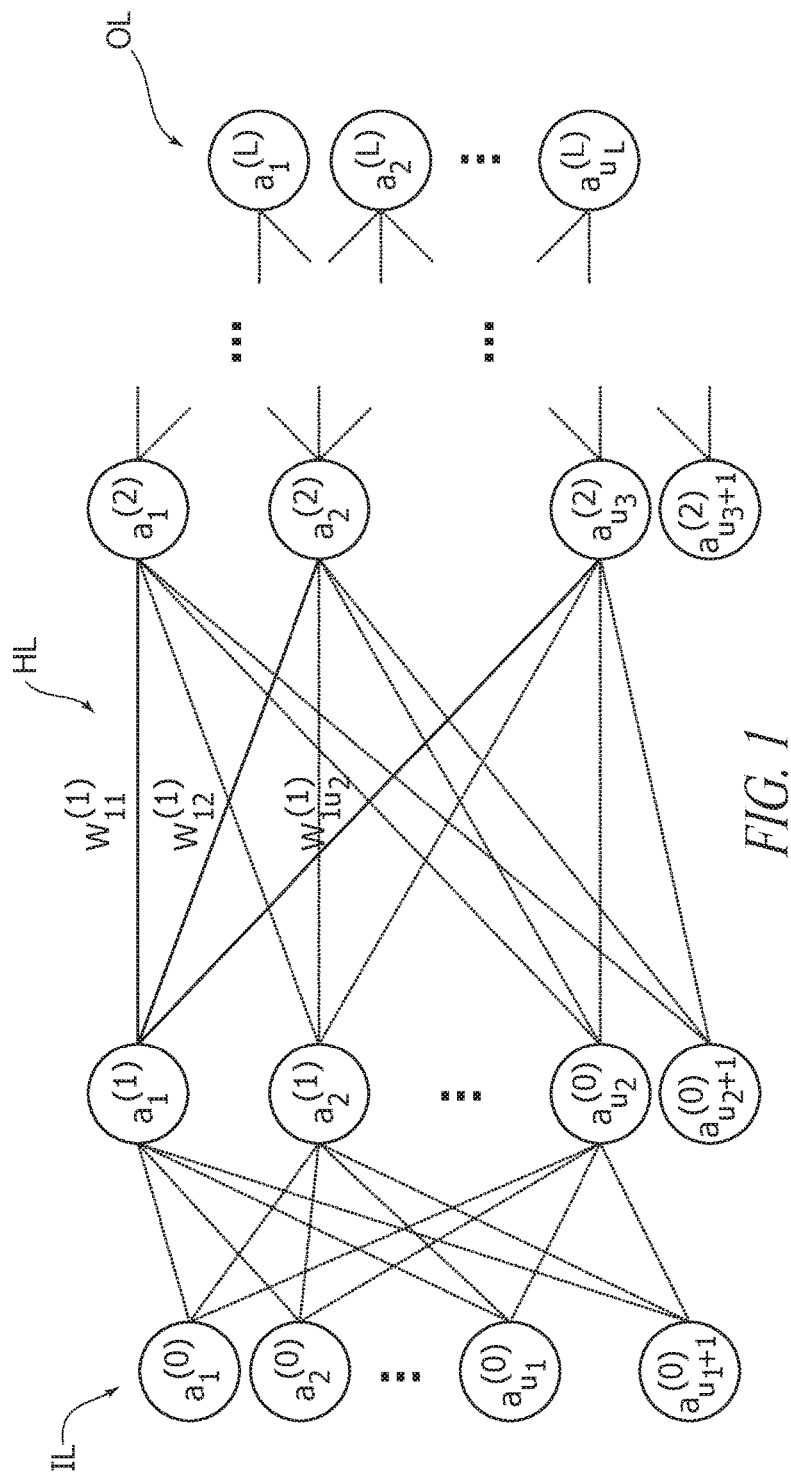
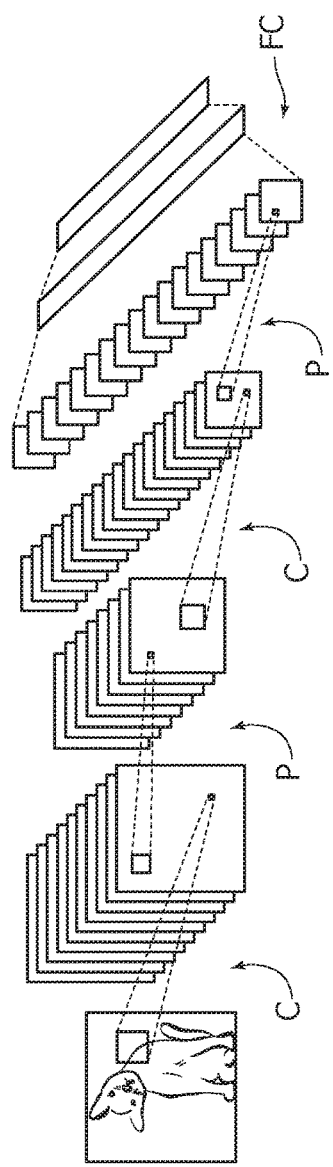
FIG. 1
FIG. 2

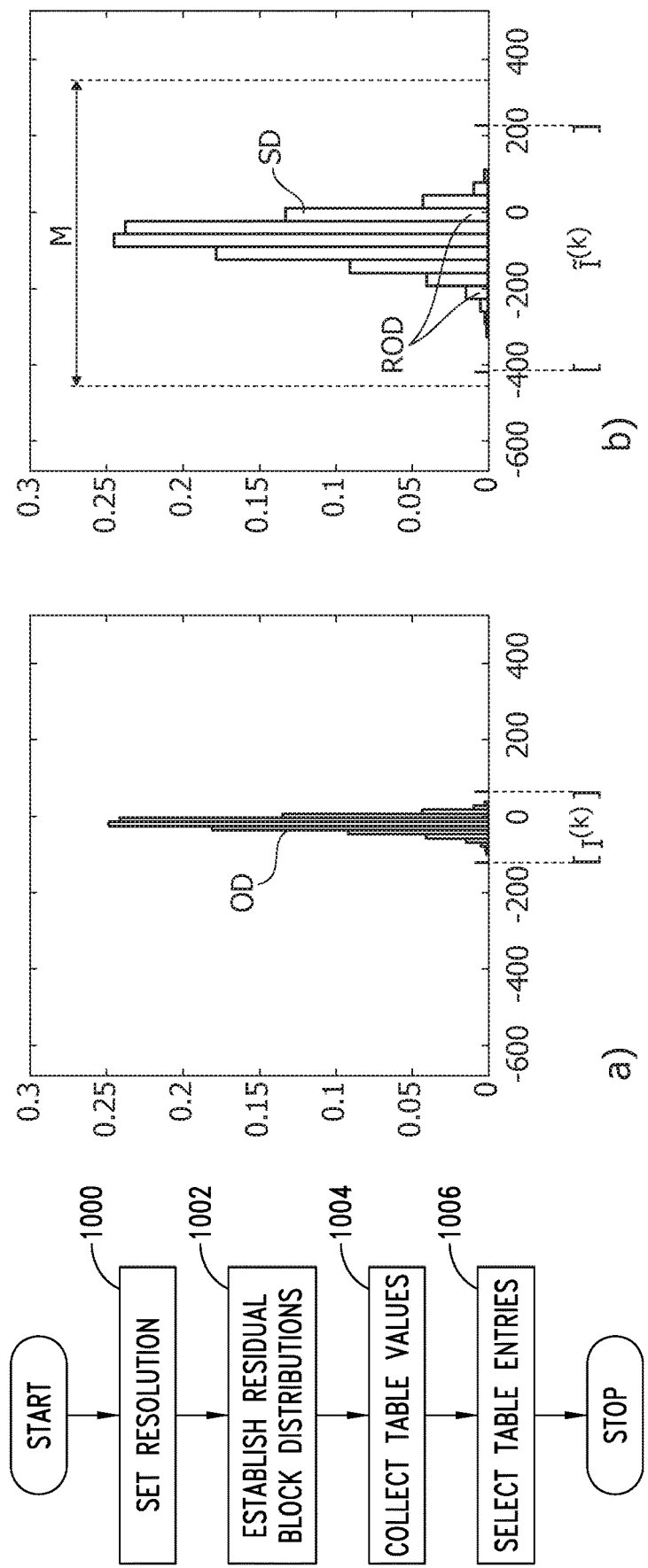

METHOD OF OPERATING NEURAL NETWORKS, CORRESPONDING NETWORK, APPARATUS AND COMPUTER PROGRAM PRODUCT

BACKGROUND

Technical Field

The description relates to neural networks.

One or more embodiments may relate to improved operation of neural networks such as convolutional neural networks.

Description of the Related Art

A neural network (NN) is a computational architecture that attempts to identify underlying relationships in a set of data by using a process that mimics the way the human brain operates. Neural networks have the ability of adapting to changing inputs so that a network may produce a best possible result without redesigning the output criteria.

Neural networks are widely used, e.g., to extract patterns and detect trends that are too complex to be noticed by either humans or other computer techniques.

Some advantages of using neural networks (NNs) include, for instance:

adaptive learning: a NN may have the ability of learning how to perform tasks based on the data provided for training or initial experience;

self-organization: a NN may create its own organization or representation of the information, e.g., as obtained during learning;

real time operation: NN processing, e.g., computations may be carried out in parallel, with hardware devices designed and manufactured in order to take advantage of this capability;

fault tolerance, e.g., via redundant information coding: while partial destruction of a network may lead to a corresponding degradation of performance, certain network capabilities may be retained even with major network damage;

noise tolerance: NNs are intrinsically robust to noise generated during the propagation of testing data.

BRIEF SUMMARY

In an embodiment, a method of operating neural networks, including a plurality of network layers including operating units performing arithmetic operations on input data to provide output data, includes: selecting a set of operating units in the network layers, and performing arithmetic operations in operating units in said selected set of operating units by performing operations in a Residue Number System, RNS, on RNS-converted input data by obtaining RNS output data in the Residue Number System, backward converting from the Residue Number System the RNS output data resulting from the RNS operations. In an embodiment, the set of selected operating units includes operating units performing operations selected out of multiplication, including dot product and matrix multiplication, additions and subtractions. In an embodiment, the set of selected operating units includes operating units performing operations homogeneous with respect to a first set and a second set of input data, the method including providing the RNS-converted input data by forward converting to a Residue Number System both said first set and said second set of input data. In an embodiment, the set of selected operating units includes operating units performing operations homogeneous with respect to a first set and a second set of input data, the method including providing the RNS-converted input data by: providing the first set of input data by forward converting to a Residue Number System said first set of input data, and providing the second set of input data as a stored set of RNS-converted input data. In an embodiment, the RNS-converted input data include data scaled by respective scale factors, wherein backward converting from the Residue Number System includes complementary re-scaling of the RNS output data resulting from the RNS operations by respective complementary scale factors. In an embodiment, the RNS-converted input data include integer-to-RNS converted data, wherein the backward converting from the Residue Number System includes RNS-to-integer conversion of the RNS output data resulting from the RNS operations. In an embodiment, the RNS-converted input data include data scaled by respective scale factors and rounded to be integer-to-RNS converted, and backward converting from the Residue Number System includes RNS-to-integer conversion and complementary re-scaling by respective complementary scale factors of the RNS output data resulting from the RNS operations. In an embodiment, the method includes at least one of: using a same set of scale factors for RNS-converted input data in a plurality of arithmetic operations in the Residue Number System RNS, and/or setting to unity the scale factors for at least a part of said RNS-converted input data, and/or the scale factors for RNS-converted input data including power-of-two scale factors, wherein scaling includes shifting of binary data. In an embodiment, the method includes performing arithmetic operations in a Residue Number System RNS with power-of-two moduli. In an embodiment, a neural network including a plurality of network layers including operating units performing arithmetic operations on input data to provide output data, the network layers including units configured to perform operations in a Residue Number System, RNS, by performing RNS operations on RNS-converted input data with an embodiment of a method disclosed herein. In an embodiment an apparatus includes, a source device providing data for processing by a neural network, and the neural network, the network being coupled to the source device and configured for receiving said data from the source device, providing neural network processing of said data and outputting output data resulting from neural network processing of said data in the neural network.

In an embodiment, a method comprises: converting input data to a set of operating circuits of a neural network to a Residual Number System (RNS) domain from one or more other domains, the neural network having a plurality of layers; performing arithmetic operations in the set of operating circuits in the RNS domain; and converting output results of the arithmetic operations of the set of operating circuits from the RNS domain to the one or more other domains. In an embodiment, the method comprises: receiving at least some of the input data from one or more sensors; and generating one or more control signals based on the converted output results. In an embodiment, the one or more control signals include one or more of: control parameters; control signals; model parameters; and warning signals. In an embodiment, the method comprises: selecting the set of operating circuits. In an embodiment, the set of operating circuits perform arithmetic operations selected out of multiplications, additions and subtractions. In an embodiment, the set of operating circuits includes operating circuits performing operations homogeneous with respect to a first set and a second set of input data, the method including converting both said first set and said second set of input data to the RNS domain. In an embodiment, the set of operating circuits includes operating circuits performing operations homogeneous with respect to a first set and a second set of input data, the method including: converting the first set of input data to the RNS domain; and retrieving the second set of input data from a memory. In an embodiment, the method comprises: scaling at least some of the input data using one or more respective scaling factors prior to converting the at least some of the input data to the RNS domain; and scaling corresponding results in the one or more other domains using one or more complimentary scaling factors. In an embodiment, the one or more other domains includes an integer domain. In an embodiment, the method comprises: rounding at least some of the scaled input data prior to converting the at least some of the scaled input data to the RNS domain. In an embodiment, the method comprises at least one of: using a same set of scaling factors for a plurality of the set of operating circuits; setting to unity scaling factors for at least a part of the set of operating circuits; and using a power-of-two scaling factor for at least one of the set of operating circuits, wherein scaling includes shifting of binary data. In an embodiment, the method comprises setting the respective scaling factors. In an embodiment, the method includes performing at least one arithmetic operations in a RNS domain with power-of-two moduli.

In an embodiment, a neural network comprises: one or more inputs, which, in operation, receive input data; one or more outputs, which, in operation, output one or more output signals; and a plurality of network layers coupled between the one or more inputs and the one or more outputs, and which, in operation, generate the one or more output signals based on the input data, the plurality of network layers including a set of operating circuits, which, in operation: convert respective sets of data to a Residual Number System (RNS) domain from one or more other domains; perform arithmetic operations in the RNS domain on the converted data; and convert respective results of the arithmetic operations from the RNS domain to the one or more other domains. In an embodiment, the input data comprises sensor data; and the output signals comprise control signals. In an embodiment, the neural network, in operation, selects the set of operating circuits. In an embodiment, the set of operating circuits, in operation, perform arithmetic operations selected out of multiplications, additions and subtractions. In an embodiment, at least some of the set of operating circuits, in operation: scale at least some of the input data using one or more respective scaling factors prior to converting the at least some of the input data to the RNS domain; and scale corresponding results in the one or more other domains using one or more complimentary scaling factors. In an embodiment, the at least some of the set of operating circuits, in operation, round at least some of the scaled input data prior to converting the at least some of the scaled input data to the RNS domain.

In an embodiment, a system comprises: circuitry, which, in operation, generates source data; a neural network coupled to the circuitry, the neural network, in operation, generating one or more output signals based on the source data and including a set of operating circuits, wherein the operating circuits, in operation: convert respective sets of data to a Residual Number System (RNS) domain from one or more other domains; perform arithmetic operations in the RNS domain on the converted data; and convert respective results of the arithmetic operations from the RNS domain to the one or more other domains. In an embodiment, the circuitry comprises one or more sensors; and the output signals comprise control signals. In an embodiment, at least some of the set of operating circuits, in operation: scale at least some of the input data using one or more respective scaling factors prior to converting the at least some of the input data to the RNS domain; and scale corresponding results in the one or more other domains using one or more complimentary scaling factors. In an embodiment, the at least some of the set of operating circuits, in operation, round at least some of the scaled input data prior to converting the at least some of the scaled input data to the RNS domain.

In an embodiment, a non-transitory computer-readable medium's contents configure a neural network having a plurality of layers to perform a method, the method comprising: converting input data to a set of operating circuits of the neural network to a Residual Number System (RNS) domain from one or more other domains; performing arithmetic operations in the set of operating circuits in the RNS domain; and converting output results of the arithmetic operations of the set of operating circuits from the RNS domain to the one or more other domains. In an embodiment, the method comprises: receiving at least some of the input data from one or more sensors; and generating one or more control signals based on the converted output results. In an embodiment, the method comprises: selecting the set of operating circuits. In an embodiment, the method comprises: scaling at least some of the input data using one or more respective scaling factors prior to converting the at least some of the input data to the RNS domain; and scaling corresponding results in the one or more other domains using one or more complimentary scaling factors. In an embodiment, the method comprises: rounding at least some of the scaled input data prior to converting the at least some of the scaled input data to the RNS domain.

One or more embodiments may also relate to a corresponding neural network and to a corresponding computer program product loadable in the memory of at least one processing device and including software code portions for executing the steps of the method when the product is run on at least one computer. As used herein, reference to such a computer program product is understood as being equivalent to reference to a computer-readable means containing instructions for controlling the processing system in order to co-ordinate implementation of the method according to one or more embodiments. Reference to "at least one processor device" is intended to highlight the possibility for one or more embodiments to be implemented in modular and/or distributed form.

One or more embodiments may be based on the recognition that noise tolerance of NNs may facilitate simplifications in hardware complexity. Such tolerance can be exploited, e.g., to compress network weights and/or to perform approximate computations without significant loss in terms of accuracy.

One or more embodiments may provide a procedure for approximating operations by using low-precision arithmetic in accelerating a forward propagation step of convolutional neural networks (CNNs). In one or more embodiments, an inference stage in a generic CNN may involve approximated computations performed using a data representation based on a low-precision Residue Number System (RNS) with rescaling stages introduced for weights and activations.

One or more embodiments may involve a procedure for "tuning up" system parameters which may handle a reduced resolution while minimizing rounding and overflow errors.

One or more embodiments may decrease hardware complexity of, e.g., dot product operators and enable a parallelized implementation operating on values represented with few bits, with minimal loss in the overall accuracy of the network.

One or more embodiments may facilitate, e.g., recent advances in deep learning that use large, deep neural networks (DNNs) with tens of millions of units suitable for a number of applications requiring real time processing. DNNs, and in particular convolutional neural networks (CNNs), may play a significant role in performing intelligent tasks in many different domains, e.g., acoustic scene classification, sensor-based activity recognition, classification of heartbeats and facial emotion recognition. A wide range of embedded systems may involve, e.g., low-power CNN accelerators for applications such as Internet of Things (IoT) or smart sensors, etc. In other words, a neural network may receive input data, such as sensor data, historical data, control parameters, etc., and various combinations thereof, and generate an one or more outputs based on the input data, such as training models, control parameters, indications of detected conditions, predicted conditions, warning signals, etc., and various combinations thereof.

In these arrangements, the resolution of adders and multipliers may be related to the resolution of residues, which in general is smaller than the resolution of the original values. Potentially, this may represent an advantage in terms of both power consumption and storage efficiency, with respect to standard 16/32-bit Multiply and ACcumulate units or blocks (MACs) or other low-precision MAC units.

In one or more embodiments, with certain sets of moduli, some operations are further simplified, which may provide an advantage in terms of efficiency.

In one or more embodiments, for instance when considering hardware-oriented implementations, the fragmentation of, e.g., a dot product operator as allowed by a RNS solution is adapted to be described as N-parallel sub operators with a (much) smaller bit width. This may lead to a quadratic complexity reduction (e.g., number of gates) for multipliers while at the same time improving the latency of the units (e.g., twice as fast for an 8 bit implementation vs. a 16 bit implementation).

In one or more embodiments, complexity reduction and timing improvements may occur (also) for adders with a linear scale with respect to the number of bits.

One or more embodiments may involve area and latency reductions which, may lead to a significant decrease in power consumption in comparison with a conventional representation, static for area and dynamic for latency.

BRIEF DESCRIPTION OF THE SEVERAL VIEWS OF THE DRAWINGS

One or more embodiments will now be described, by way of example only, with reference to the annexed figures, wherein:

FIG. 1 is generally exemplary of a neural network (NN);

FIG. 2 is an exemplary representation of a convolutional neural network (CNN);

FIG. 11 is a flow chart exemplary of a procedure which may be used in embodiments;

FIG. 12, including two portions designated a) and b) respectively, is illustrative of possible results of the procedure of FIG. 11;

DETAILED DESCRIPTION

Figure 3:
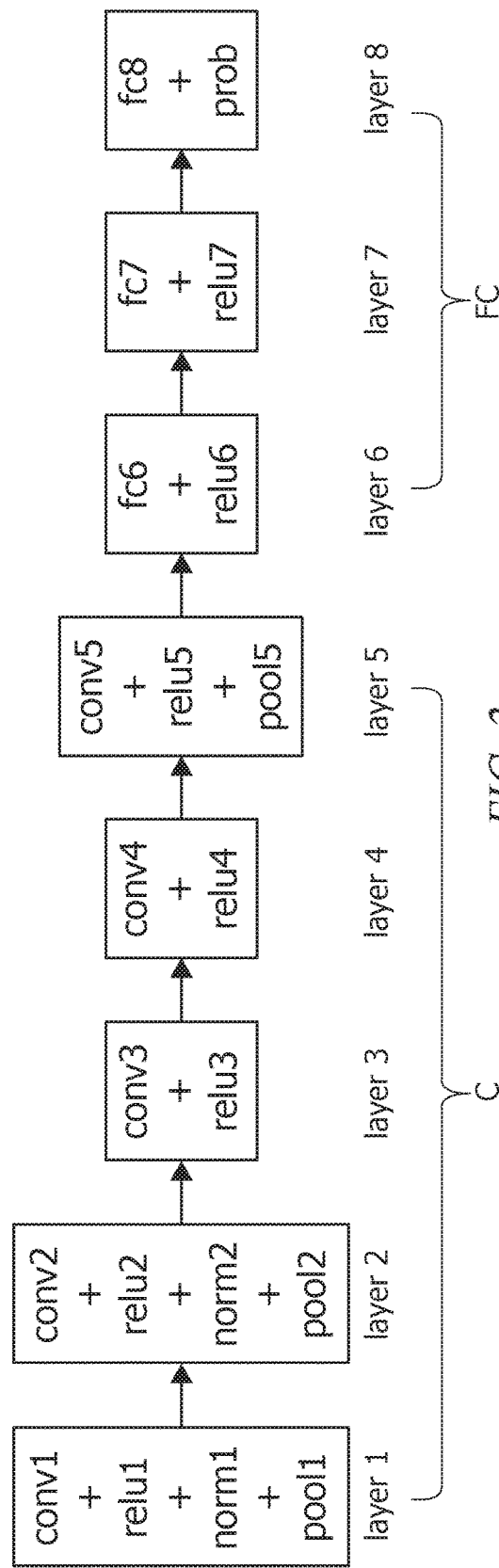
FIGS. 3 and 4 are diagram exemplary of neural networks such as AlexNet and GoogLeNet.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

One or more embodiments may contribute to accelerating forward propagation in neural networks.

Convolutional neural networks (CNNs), which can be generally ascribed to the "family" of so-called deep neural networks (DNNs), are exemplary of neural networks to which one or more embodiments may apply.

DNNs are neural networks structured in successive layers of computing units and may have different architectures.

From a formal viewpoint, a neural network architecture may be described as a "tuple" (I, U, O, E) consisting of a set I of input sites, a set U of computing units, a set O of output sites and a set E of weighted directed edges.

A directed edge is a tuple (i, o, w) where $i \in I \cup U, o \in U \cup O$ and $w \in \mathbb{R}$ Even if—strictly speaking—they are not computing units and represent only entry points for the information into the network, the input sites are called input units.

For instance, input data to the input units may be images, but also other kinds of digital signals: acoustic signals, bio-medical signals, inertial signals from gyroscopes and accelerometers may be exemplary of these.

The output sites are called output units, and they are computing units whose results constitute the output of the network.

Finally, the computing sites in U are called hidden units.

The units are grouped in successive levels, called layers, such that there are connections only from the units of a layer to the units of the successive layer.

In one or more embodiments, the direction of propagation of the information may be unilateral, e.g., of a feed-forward type, starting from the input layer and proceeding through the hidden layers up to the output layer.

Assuming that the network has L layers, one may adopt the convention of denoting the layers with k=1, 2, . . . , L, starting from the input layer, going on through the hidden layers up to the output layer.

By considering the layer $L_k$, in a possible notation:

$u_k$: denotes the number of units of the layer k, $a_i^{(k)}$ i=1, . . . , $u_k$: denotes a unit of layer k or equivalently its value, $W^{(k)}$: denotes the matrix of the weights from the units of layer k to the units of layer (k+1); it is not defined for the output layer.

The values $a_i^{(k)}$ i=1, . . . , $u_l$ are the results of the computation performed by the units, except for the input units, for which the values $a_i^{(0)}$ i=1, . . . , $u_l$ are the input values of the network. These values represent the activation values, or briefly, the "activations" of the units.

The element (i, j) of matrix $W^{(k)}$ is the value of the weight from the unit $a_i^{(k)}$ to the unit $a_j^{(k+1)}$.

Such weights may be learned via a back-propagation algorithm.

Moreover, for each layer k=1, . . . , (L−1), an additional unit $a_{u_k+1}^{(k)}$, denoted as the bias unit can be considered (e.g., with a value fixed to 1) which allows shifting the activation function to the left or right.

A computing unit $a_i^{(k+1)}$ may perform a computation which can be described as a combination of two functions:

an activation function f, which may be a non-linear monotonic function, such as a sigmoidal function, or a rectifier function (a unit employing a rectifier function is called a rectified linear unit or ReLU), a function $g_i$ specifically defined for the unit which takes as values the activations of the previous layer and the weights of the current layer $g_i(a_1^{(k-1)}, a_2^{(k-1)}, \ldots, a_{u_{k-1}+1}^{(k)}, W^{(k)})$.

In one or more embodiments, operation (execution) of a neural network as exemplified herein may involve a computation of the activations of the computing units following the direction of the network, e.g., with propagation of information from the input layer to the output layer. This procedure is called forward propagation.

FIG. 1 is exemplary of a network arrangement as discussed in the foregoing, including L+1 layers, including an input layer IL (layer 0), hidden layers HL (e.g., layer 1, layer 2, . . . ) and an output layer OL (layer L).

CNNs correspond to the basic layout of deep neural networks discussed previously and include neurons with "learnable" weight and bias values. Each neuron may receive some inputs and perform a specific computation, which may optionally include an activation function. A basic idea underlying CNNs may combine three architectural ideas to facilitate achieving some degree of shift and distortion invariance: local receptive fields, shared weights, and, sometimes, spatial or temporal subsampling.

A CNN may include three types of layers:
convolutional layers,
pooling layers,
fully-connected layers.

These layers can be combined in many ways producing a (wide) variety of different structures.

For instance, a CNN architecture may include some pairs of a convolutional layers followed by a subsampling layer, and then final fully-connected layers.

An exemplary structure of a CNN is shown in FIG. 2 where C, P and FC denote convolution, pooling and full connection layers, respectively.

For instance, the input to a CNN may include, e.g., a 2-dimensional or a 3-dimensional matrix, and the convolutional and subsampling layers may receive a multi-dimensional matrix as an input and provide a multi-dimensional matrix as an output. These matrices are denoted as the input or output features, and each value in these matrices is denoted as a pixel.

In a fully-connected layer all the units may be connected through weighted edges to all the units of the previous layer, since this type of layer is the same of the standard feed-forward network.

Finally, the pooling layers perform some form of nonlinear subsampling, which may reduce the sensitivity of the output to shifts and distortions. The more frequent pooling operations are the mean (average) or the maximum of the values of the portion of pixels.

AlexNet and GoogLeNet are exemplary of well-known trained CNNs. These are (very) large and deep convolutional neural networks, developed in order to classify the images from the ImageNet LSVRC contest into 1000 different classes.

AlexNet was proposed in 2010 by Krizhevsky et al. in: "Imagenet classification with deep convolutional neural networks," in Advances in neural information processing systems, pp. 1097-1105, 2012.

GoogLeNet was proposed in 2015 in C. Szegedy, et al.: "Going deeper with convolutions," in Computer Vision and Pattern Recognition (CVPR), 2015.

These networks differ from each other for certain aspects in their general architecture.

For instance, GoogLeNet includes so-called Inception subnetworks, which perform different sizes of convolutions and concatenate the filters for the next layer. In AlexNet, on the other hand, layer input is provided by one previous layer instead of a filter concatenation.

Figure 4:
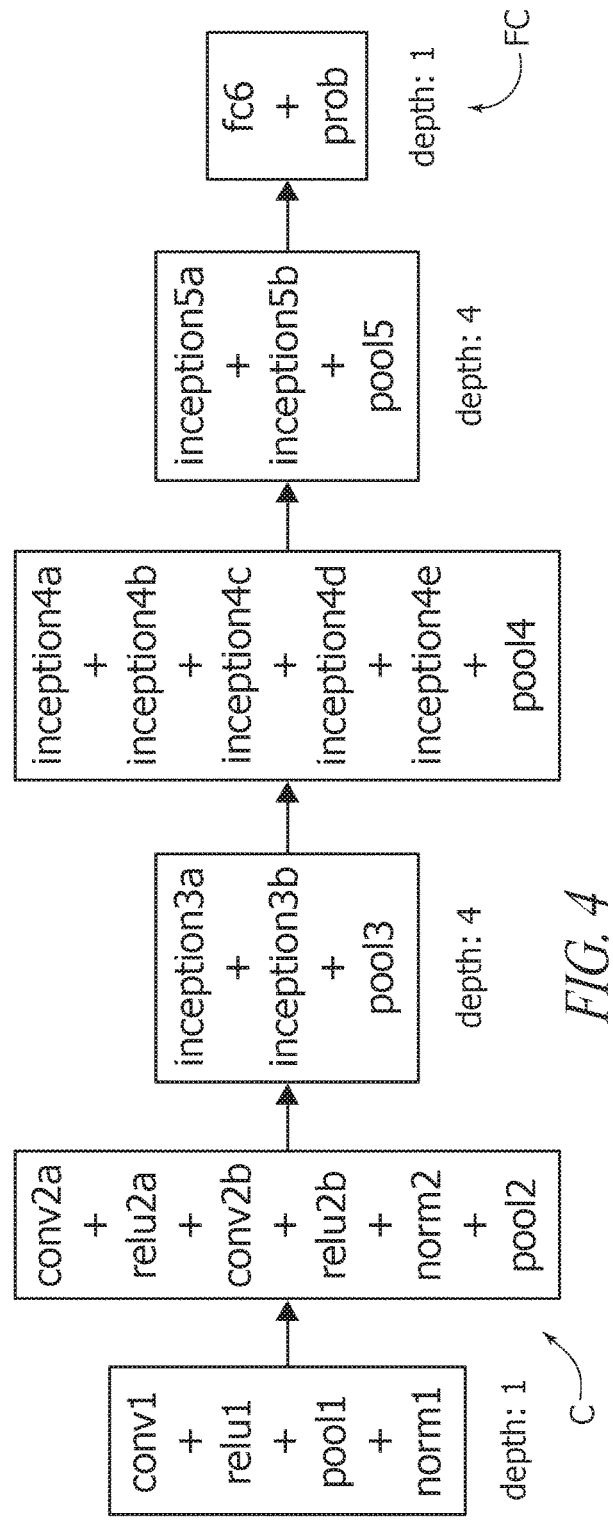

Exemplary architectures for AlexNet and GoogLeNet are illustrated in FIGS. 3 and 4, where the abbreviations in the various boxes therein have the following meanings:
conv=convolution
relu=rectifier linear unit
norm=local response normalization
pool=pooling
fc=full connection
prob=a softmax layer which calculates a multinomial logistic regression function
inception=inception (as discussed in the following).

As schematically shown in FIG. 3, AlexNet includes eight weight layers: the first five (layer 1 to layer 5) are convolutional layers C, while the three last layers (layer 6 to layer 8) are fully-connected layers FC. The last layer is fed to a 1000-units softmax layer, which produces a distribution over the 1000 class labels.

As schematically shown in FIG. 4 (where the "depth" values indicate the number of layers), GoogLeNet includes twenty-two levels of weighted layers, including again convolutional and fully connected layers C and FC, with certain layers grouped in inception subnetworks I. The overall number of layers (independent building blocks) used for the construction of the network is about 100: the exact number depends on how layers are counted by the machine learning infrastructure.

An inception I may be a network consisting of convolutional modules stacked upon each other with occasional max-pooling modules. The network has a depth of two levels and the module results are concatenated producing the output of the Inception network.

Figure 5:
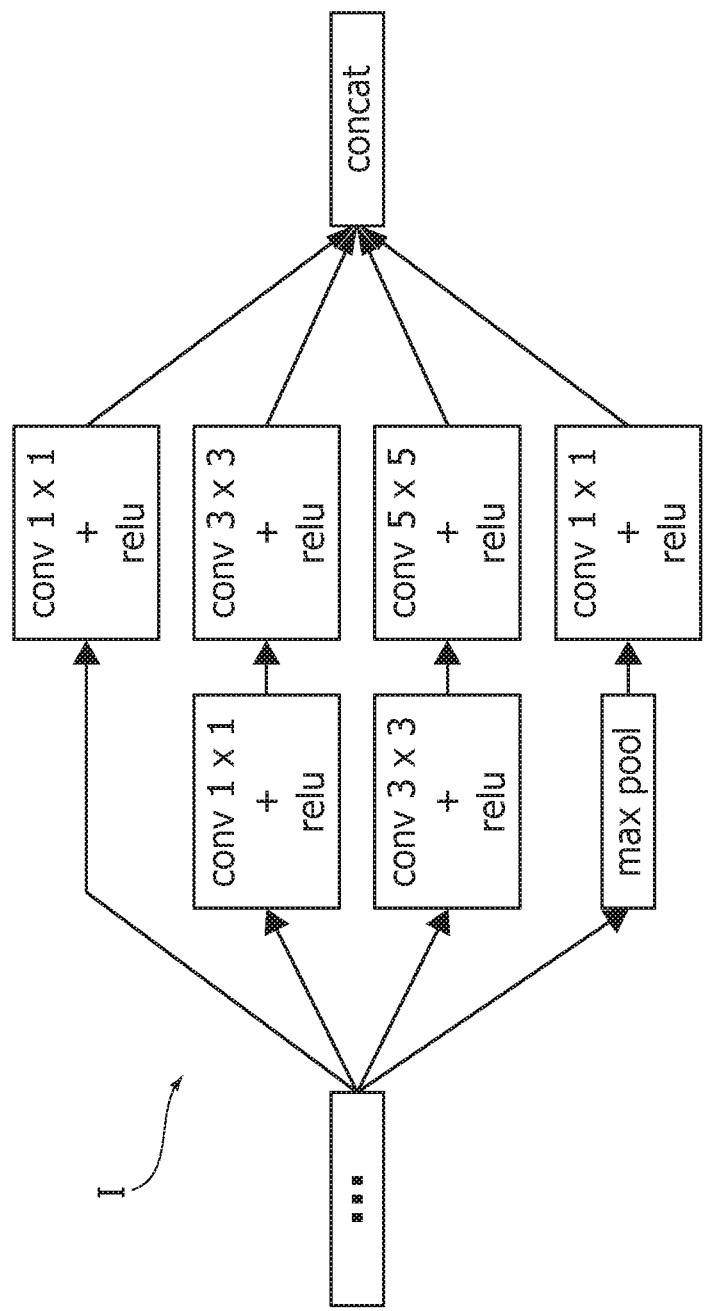
FIG. 5 is a diagram exemplary of a so-called inception as included in a neural network as illustrated in FIG. 4.

A possible architecture of an inception is depicted in the FIG. 5, where the definitions provided in the foregoing apply to the labeling in the various blocks, and "max pool" and "concat" denote maximum pooling and concatenation, respectively.

Complexity of CNNs may be related primarily to convolutions (e.g., in convolutional layers) and matrix multiplications (e.g., in fully connected layers).

In both instances, a key operation may be represented by a dot (or "inner") product.

Let $w=[w_1, \ldots, w_u]^T$ and $a=[a_1, \ldots, a_u]^T$ be two vectors, then the dot product thereof, $z=w^T a$, can be computed according to the formula $$z = \sum_{j=1}^{u} w_j a_j \qquad (1)$$

where each component $a_j$ (e.g., activations) and $w_j$ (e.g., weights) can be represented using any numerical representation, e.g., floating-point, fixed-point or others.

Using conventional digital hardware, the dot product operation can be performed using Multiply-and-ACcumulate (MAC) operations.

For example, for an image 224×224, a single category labeling classification with 1000 classes may require, by using AlexNet, close to 2.15 giga MAC operations.

Simplifying/accelerating such operations may thus play a significant role in permitting large networks to be run in real-time applications over mobile or embedded platforms (e.g., low-power wearable or IoT devices).

Addressing this problem with HW acceleration and off-loading may led to improvements in terms of performance and power efficiency; however, the resulting HW may turn out to be expensive to implement (e.g., in terms of silicon area); additionally, energy budget requirements may not be met for constrained applications.

Various approaches have been proposed in order to accelerate computation in CNNs in recent years, e.g., by exploring the use of non-conventional data representation for accelerating the forward propagation step.

For instance, the document Miyashita et al., "Convolutional neural networks using logarithmic data representation," arXiv preprint arXiv:1603.01025, 2016 describes a non-conventional data representation based on a base-2 logarithmic system. Weights and activations are represented at low precision in the log-domain thus obviating the need for digital multipliers (multiplications become additions in the log-domain) and obtaining higher accuracy than fixed-point at the same resolution. While taking advantage of recasting dot products in the log-domain, this solution still requires accumulators at full precision (e.g., 32 bits). Also, while log-domain representation shows a good complexity reduction potential, a full analysis in terms of the costs associated to the HW implementation of a complete chain of processing in a convolutional stage is not documented.

In H. Nakahara et al., "A deep convolutional neural network based on nested residue number system," in 2015 25th International Conference on Field Programmable Logic and Applications (FPL), pp. 1-6, IEEE, 2015 a non-conventional data representation is presented based on a Nested Residue Number. Specifically a so-called NRNS system (a variation of the Residue Number System—RNS) is proposed. A 48-bit fixed-point representation is used for weights and activations, and dot products of convolutional layers are computed in parallel using an NRNS at high precision in order to cover a maximum dynamic range of 2103. By applying NRNS, standard MAC units may be decomposed into parallel 4-bit MACs.

One or more embodiments may be based on the recognition that a RNS representation may exploit the CNN error propagation resiliency by adopting a low-precision Residue Number System—RNS and adequately tuned rescaling stages in order to manage the reduced resolution of data and accumulators and increasing the resulting accuracy.

One or more embodiments may be based on the recognition that the algorithmic-level noise tolerance of neural networks such as CNNs may facilitate simplifications in hardware complexity, such as, e.g., resorting to a low-precision approach in certain calculations.

One or more embodiments may thus involve approximating operations by using low-precision arithmetic for accelerating the forward propagation step of, e.g., CNNs, for instance by computing dot products in the Residue Number System (RNS), thus facilitating more efficient network operation, e.g., in digital hardware.

For instance, one or more embodiments may involve redefining the general architecture of a neural network such as a CNN.

Such a redefinition may involve, for each layer:

selecting those operations which involve, e.g., dot products, which may constitute RNS blocks, concatenating dedicated converters before (e.g., from floating, or possibly fixed, to RNS) and after (e.g., from RNS to floating) each RNS block, performing computations in each RNS block using dedicated RNS operation units.

Recalling some basic mathematical concepts underlying the Residue Number System or RNS may be helpful by way of introduction to the detailed description of exemplary embodiments.

A residue number system or RNS is characterized by a set of integers $(m_N, \ldots, m_1)$, called base, where every integer $m_i$ is called modulus.

RNS is an integer number system where the number of different representations is given by the least common multiple of the moduli, and it is denoted by M.

A number $x \in \mathbb{Z}$ is represented in the RNS by the set of residues $(x_N, \ldots, x_1)$ where $x_i := |x|_{m_i} = x \bmod m_i$ for $i=1, \ldots, N$.

Conversely, the corresponding value of a RNS number is provided by the Chinese Remainder Theorem modulo M, under the assumption that the moduli are pairwise relatively prime: see, e.g., H. E. Rose, A course in number theory. Chapter 3, pp. 36-37, Oxford University Press, 1995.

In order to have a univocal corresponding value for each RNS number, the RNS can be accompanied with a range of represented values, denoted by $I_{RNS}=[r, r+M-1]$.

In that way, a given RNS number $(x_N, \ldots, x_1)$ is converted to $x=v$ if $x \in I_{RNS}$, or $x=v-M$ otherwise, where $$v = \left| \sum_{j=1}^{N} x_j \cdot \hat{m}_j \left| \frac{1}{\hat{m}_j} \right|_{m_j} \right|_M$$

is obtained by applying the Chinese Remainder Theorem, where $$\hat{m}_j = \frac{M}{m_j} \text{ and } \left|\frac{1}{c}\right|_{m_j}$$

stands for the multiplicative inverse of a number c modulo $m_j$.

The selection of RNS blocks in a CNN simply comprises recognizing which network operations involve, e.g., dot products or, more generally, are homogeneous with respect to activations and weights.

For a convolutional layer, the RNS block consists of convolutions, while for a fully connected layer it consists of a matrix product.

In one or more embodiments (in the exemplary case of AlexNet: see FIG. 3 as discussed previously), each convolutional layer C and fully-connected layer FC may thus include (e.g., begin with) a RNS block.

Figure 6:
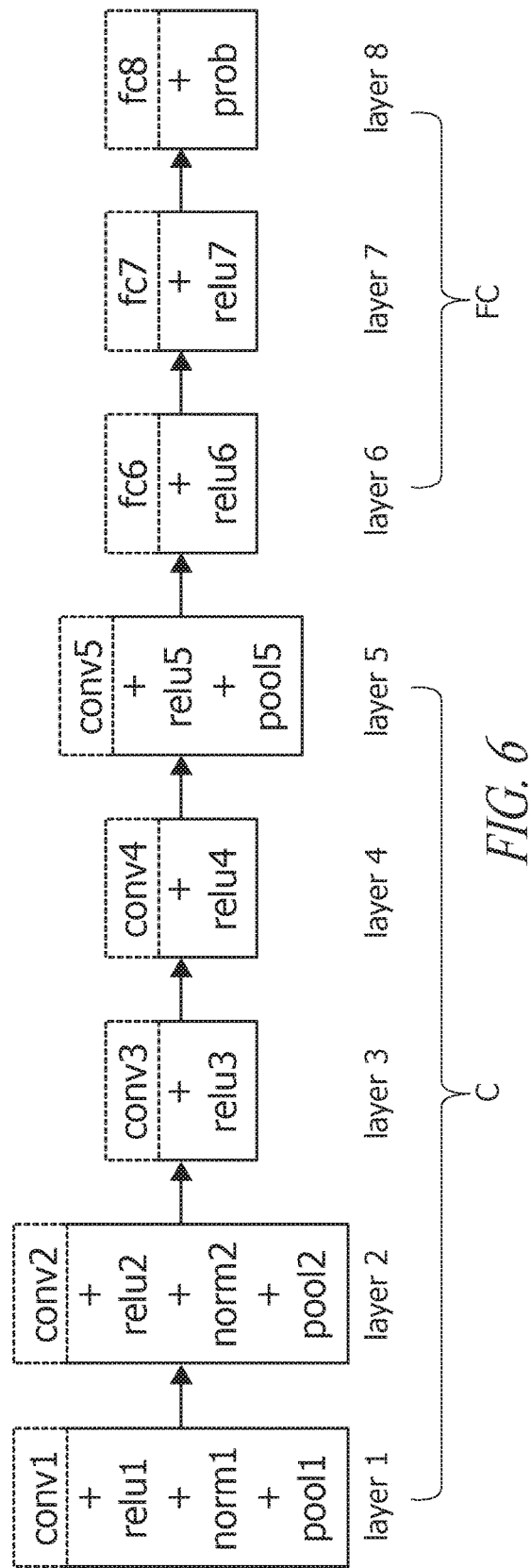
FIGS. 6, 7 and 8 are exemplary of possible use of embodiments in neural networks as exemplified in the diagrams of FIGS. 3, 4 and 5, FIGS. 9 and 10 are functional representations of embodiments.

This situation is exemplified, in FIG. 6, where the same basic layout of FIG. 3 is reproduced with the RNS blocks highlighted in dashed lines.

In the case of GoogLeNet, RNS blocks may be used for convolutions practically for all blocks but one (all in the inception networks), while for the last layer, which is a fully connected layer, RNS may be used for a matrix product.

Figure 7:
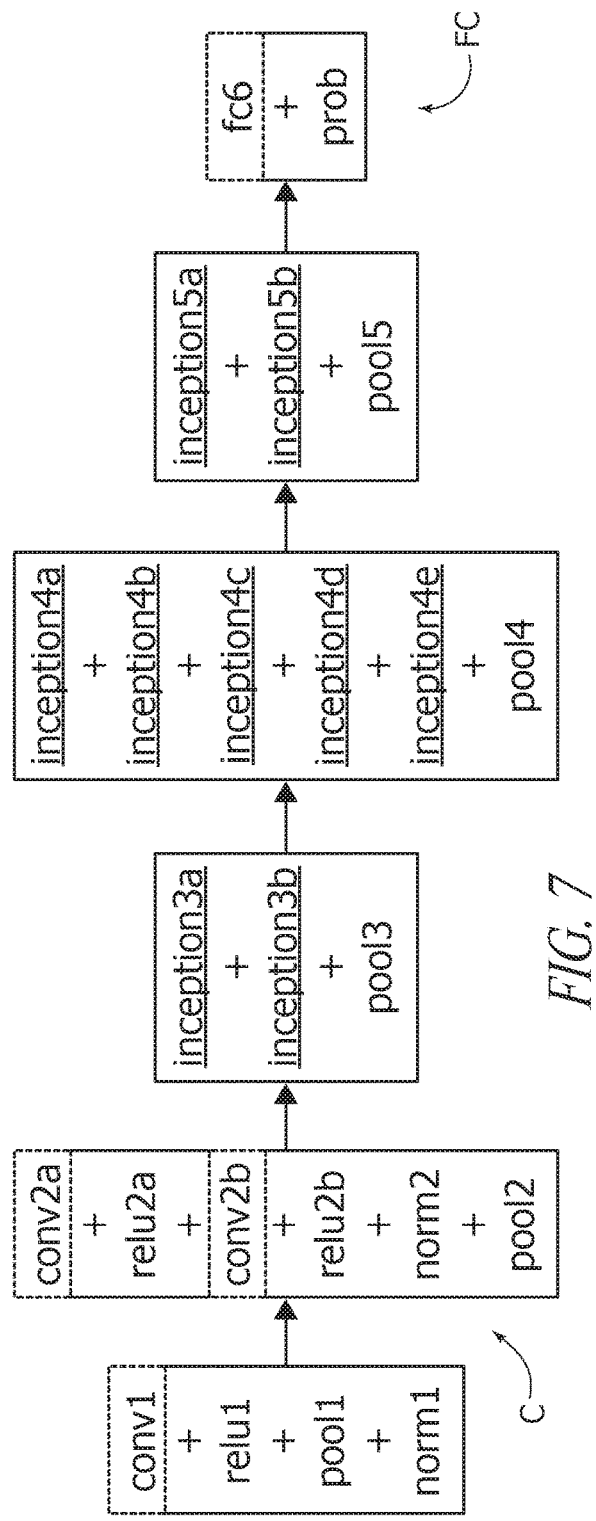
Figure 8:
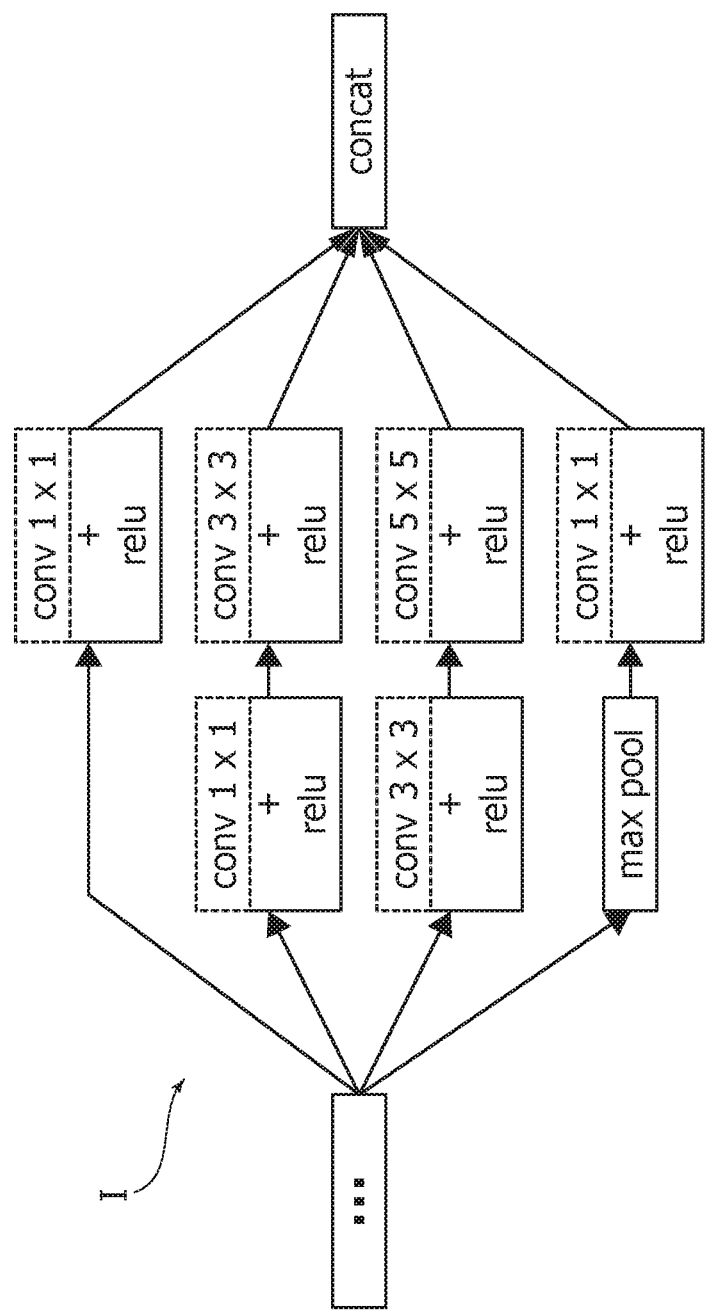

The selection of RNS blocks in such a network is highlighted in dashed lines in FIGS. 7 and 8.

Once all RNS blocks are selected in a certain network to be implemented, dedicated FW (forward) and BW (backward) converters may be concatenated before and after each RNS block, respectively.

In one more embodiments two different schemes may be adopted for that purpose.

In a first, general scheme, both weights $w_j$ activations $a_j$ may be converted on-line for a fixed moduli set.

In a second, alternative scheme either of weights or activations, e.g., weights $w_j$ are converted off-line and stored in RNS representation using a Look-Up Table or LUT.

Figure 9:
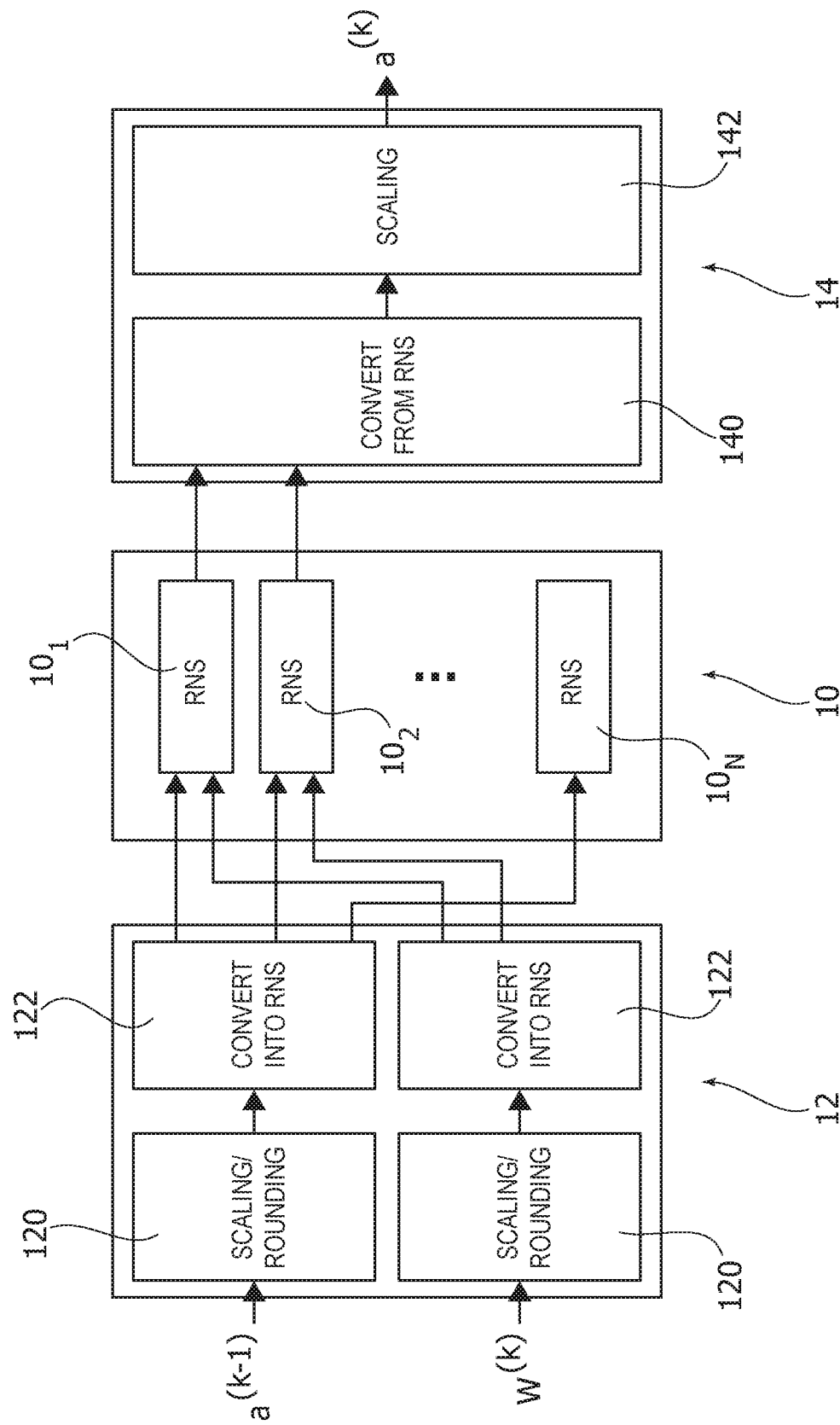
Figure 10:
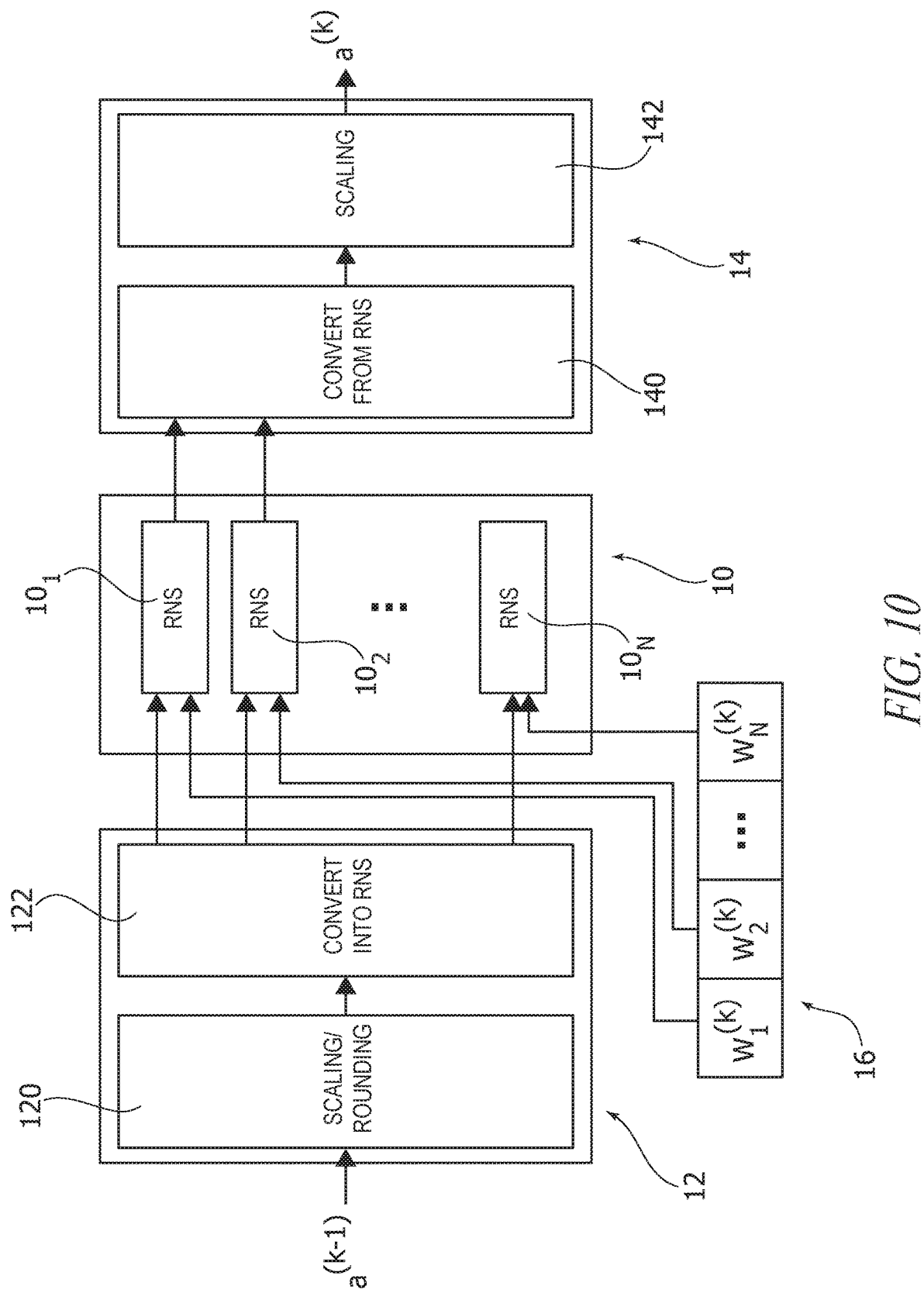

The two schemes are illustrated in FIGS. 9 and 10, respectively.

In these figures, 10 denotes a RNS block or circuit (including, e.g., a number N of RNS operation units or circuits $10_1, 10_2, \ldots, 10_N$) preceded by a FW converter circuit 12 and followed by a BW converter circuit 14.

In FIG. 10, reference 16 denotes a storage unit or circuit (e.g., a LUT) for storing parameters (e.g., weights $w_j$) converted off-line. The storage circuit 16 may be coupled to or integrated into the RNS circuit 10, may comprise a set of storage circuits coupled to or integrated into the operational circuits of RNS circuit 10, etc.

In one or more embodiments, irrespective of the scheme adopted (on-line or off-line) processing as discussed may involve conversion proper into RNS (e.g., at converter circuits 122) and from RNS (e.g., at converter circuits 140): this permits operation (e.g., computation) of the RNS block or circuitry 10 to take place in RNS representation.

In one or more embodiments, scaling plus rounding of the input parameters (e.g., at scaling/rounding circuitry 120) and complementary scaling of the results (e.g., at scaling circuitry 142) may facilitate maintaining more information from the original values of data. The input data may be received, for example, at an input terminal or node of the converter 12.

For instance, in the general scheme of FIG. 9, in blocks 120 in the forward converter 12, activations from the previous layer and weights may be multiplied by respective scale factors $\lambda_w^{(k)}$ and $\lambda_{act}^{(k)}$, then rounded to integer and converted to RNS representation in blocks 122.

Similarly, in the alternative scheme of FIG. 10, weights multiplied by the corresponding scale factor, rounded and converted offline may be stored in RNS representation in the memory 16, while in a block 120 in the forward converter 12, activations from the previous layer may be multiplied by a scale factor $\lambda_{act}^{(k)}$, then rounded to integer and converted to RNS representation in a block 122.

In one or more embodiments, the backward converter 14 may first perform the conversion of the output of the RNS block 10 back to integer in a block 140 and then divide the result by $(\lambda_w^{(k)} \cdot \lambda_{act}^{(k)})$ in block 142 in case scaling and rounding has been applied at 120. The converted output may be provided by an output terminal or node of the backward converter 14.

In one or more embodiments, the scale factors $\lambda_w^{(k)}$ and $\lambda_{act}^{(k)}$ may define both the quantity of information from the original weights and activations which is maintained after the rounding and the magnitude of the range of the RNS values inside each RNS block.

In one or more embodiments, scale factors may be selected in order to limit the rounding errors and determine a range of values that reduces the risk of overflow. This may be relevant, e.g., for weights $w_j$ having values in the interval (−1, 1), which may be highly concentrated around 0.

In one or more embodiments, large scale factors may be considered in order to retain much information after rounding. On the other hand, large scale factors may increase the range of the output values, which may result in an increased risk of overflow. One or more embodiments may not contemplate overflow detection, with errors possibly deriving from rounding of weights and activations and/or from overflow.

In one or more embodiments network accuracy may be increased by resorting to procedure for "customizing" scale factors for each layer.

As schematically represented in the flow chart of FIG. 11, a first step 1000 in such a procedure may involve setting a sufficiently large resolution M for weights and activations (for example 16 bits), so that one may consider the same RNS base for each "residual" block, while the ranges are different.

In a step 1002, output distributions of the residual blocks performing the forward propagation on the original CNN over a random subsample of the inputs may be estimated. To that effect, values at the output of the residual block k may be collected in $v^{(k)}$.

By denoting by $I^{(k)}$ the input range of values, processing as discussed above may result in an estimated output distribution of the block k which may be expressed as:

$$\tilde{I}^{(k)} = [\text{round}(\lambda_w^{(k)} \lambda_{act}^{(k)} \min(I^{(k)})), \text{round}(\lambda_w^{(k)} \lambda_{act}^{(k)} \max(I^{(k)}))] \quad (2)$$

In a step 1004, in order to customize the scale factors, values for the following tables may collected as exemplified below:

TABLE 1

$\left(\lambda_w^{(k)} \cdot \lambda_{act}^{(k)}\right)$ for $k = 1, \ldots, L$ vs.

$f = [0.95, 0.9, 0.85, 0.8]$ where $f = \frac{|\tilde{I}^{(k)}|}{M}$,

TABLE 2

$k = 1, \ldots, L$ vs. $\lambda_{w, min}^{(k)}$, where $\lambda_{w, min}^{(k)}$, is the lowest value for which the rounding errors do not affect network accuracy (e.g., a value which the impact of rounding errors on network accuracy would not be expected to be significant, would be expected to be below a threshold value, etc.).

TABLE 3

$k = 1, \ldots, L$ vs. $\lambda_{act, min}^{(k)}$ where $\lambda_{act, min}^{(k)}$ is the lowest value for which the rounding errors do not affect network accuracy (e.g., a value which the impact of rounding errors on network accuracy would not be expected to be significant, would be expected to be below a threshold value, etc.).

In a step 1006, for each layer, the rightmost entry in Table 1 that is greater than the corresponding product $(\lambda_{w,min}^{(k)} \cdot \lambda_{act,min}^{(k)})$ is selected.

Assuming that the ratio between the scale factors is given by the ratio of the minimum values, $$\text{e.g., } \frac{\lambda_w^{(k)}}{\lambda_{act}^{(k)}} = \frac{\lambda_{w,min}^{(k)}}{\lambda_{act,min}^{(k)}},$$

the scale factors may be computed under the condition that their product is equal to the selected entry of Table 1.

Such procedure is further exemplified in the two portions a) and b) of FIG. 12, where OD and ID denote the original distribution and the scaled distribution, respectively.

FIG. 12 is exemplary of the selection of an entry of Table 1.

Portion a) portrays an exemplary possible histogram of an "original" distribution OD in $v^{(k)}$, with the range $I^{(k)}$ highlighted.

The distribution in $v^{(k)}$ may be used in order to select a value for $(\lambda_w^{(k)} \cdot \lambda_{act}^{(k)})$ which satisfies a specific condition.

By way of example one may assume $f=0.8$, meaning that the output distribution scaled with a proper factor has a range whose width is equal to 0.8 times the width of the RNS range, M. With this additional constrain, a value for the product $(\lambda_w^{(k)} \cdot \lambda_{act}^{(k)})$ can be computed.

Portion b) shows an exemplary histogram of a scaled distribution SD for which, e.g., $f=0.8$, and in this case corresponds to $(\lambda_w^{(k)} \cdot \lambda_{act}^{(k)})=3$, with the range $\tilde{I}^{(k)}=[\text{round}(\lambda_w^{(k)} \lambda_{act}^{(k)} \min(I^{(k)})), \text{round}(\lambda_w^{(k)} \lambda_{act}^{(k)} \max(I^{(k)}))]$ shown.

It was observed that a procedure as discussed above may involve a multiplication for each activation (and for each weight, in the general scheme).

One may however similarly observe that:

while a multiplication may be performed for each activation, the resulting values may be used several times in a batch computation scheme for many RNS units in parallel, thus averaging the computational cost over several outputs;

it was experimentally verified that $\lambda_{act}^{(k)}=1$ may be oftentimes chosen without appreciably affecting network accuracy, with no multiplication required for $\lambda_{act}^{(k)}$.

Also, in the process for the search of $\lambda_w^{(k)}$ and $\lambda_{act}^{(k)}$, a further constrain can be added by considering numbers in the form $2^s$ as scale factors, so that multiplications and divisions (in binary form) involve a simple shift.

From the viewpoint of hardware implementation, this may be advantageous. Even if applied (only) to the weights, such an approach may permit to choose the general scheme (where the weights are converted "each time" and not stored, e.g., in a LUT) in embodiments where amount of available memory may represent a point to consider.

In one or more embodiments, one may thus consider each layer k and select an adequate power of 2 for the scale factors $\lambda_w^{(k)}$ and $\lambda_{act}^{(k)}$.

An exemplary procedure for properly setting the scale factors for the residual block k to power of 2 is described below.

One may select a lower bound (e.g., minimum) for the powers of 2 which are greater than $\lambda_{w,min}^{(k)}$ and $\lambda_{act,min}^{(k)}$. Such values may be denoted as $\tilde{\lambda}_{w,min}^{(k)}$ and $\tilde{\lambda}_{act,min}^{(k)}$, respectively.

If the product $(\tilde{\lambda}_{w,min}^{(k)} \cdot \tilde{\lambda}_{act,min}^{(k)})$ is lower than one or more entries in the corresponding row in Table 1, one may set the scale factors to these powers, e.g., $\lambda_w^{(k)} = \tilde{\lambda}_{w,min}^{(k)}$ and $\lambda_{act}^{(k)} = \tilde{\lambda}_{act,min}^{(k)}$.

The exemplary procedure for the selection of scale factors just described assumes that the resolution is sufficiently large. This means that, in general, the minimum distribution obtained by multiplying the values of $v^{(k)}$ by $(\tilde{\lambda}_{w,min}^{(k)} \cdot \tilde{\lambda}_{act,min}^{(k)})$ has a range which is sufficiently lower than M. This facilitates selecting values that do not affect the network accuracy by rounding and overflow errors.

In that respect, various options may be considered.

For instance, resolution may be increased or some testing may be performed on a "grid" of candidate scale factors in order to select a value leading to a judicious trade-off between the two error sources.

For instance, in one or more embodiments, if for a layer k every entry in the corresponding row of Table 1 is lower than the product $(\tilde{\lambda}_{w,min}^{(k)} \cdot \tilde{\lambda}_{act,min}^{(k)})$, a grid of increasing values from the lowest value for both $\lambda_w^{(k)}$ and $\lambda_{act}^{(k)}$ may be set.

Then, a test may be performed over a random subset of inputs with the aim of selecting the values that provide an increased accuracy (e.g., by maximizing it).

In that case, if the selected values for the scale factors produce a range $\tilde{I}^{(k)}$ whose width is greater than M, the RNS range can be selected in a different manner with respect to other cases, as discussed in the following.

For instance, in one or more embodiments, a RNS range may be selected in order to increase (e.g., maximize) the percentage of values of $\tilde{v}^{(k)}$ that belongs to it.

For instance, after setting the scale factors for each residual block k, a RNS range, denoted by $I_{act}^{(k)}=[r^{(k)}, r^{(k)}+M-1]$ may be selected, with the parameters $r^{(k)}$ customized in order to include the estimated output range $\tilde{I}^{(k)}$ while at the same time reducing the probability of overflows.

Figure 13:
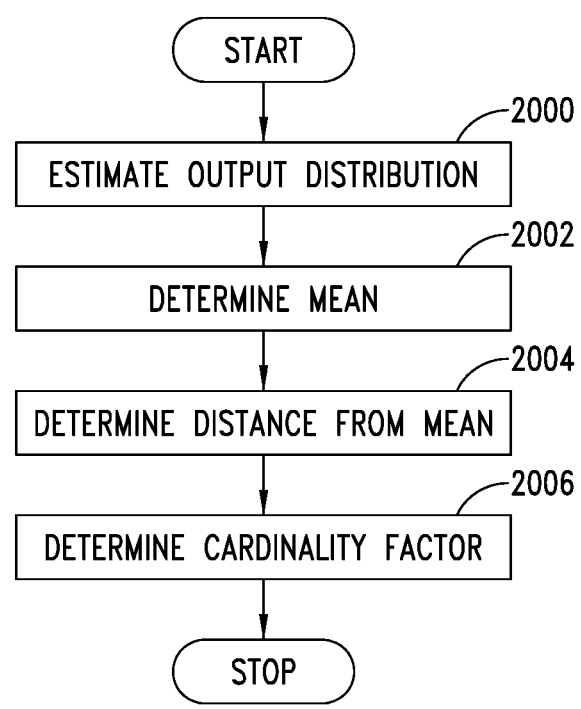
FIG. 13 is a flow chart exemplary of a procedure which may be used in embodiments.

FIG. 13 is a flow chart for an exemplary procedure for each residual block k.

In a step 2000 an estimated output distribution, denoted by $\tilde{v}^{(k)}$, is computed where each component is obtained by the corresponding one in $v^{(k)}$ multiplied by $(\lambda_{act}^{(k)} \cdot \lambda_w^{(k)})$.

In a step 2002 the mean (average) of the values in $\tilde{v}^{(k)}$, denoted by mean$^{(k)}$ is computed.

In a step 2004 distance of the lowest (minimum) value of $\tilde{I}^{(k)}$ from the mean is computed, e.g., $$dSx^{(k)} = |\min(\tilde{I}^{(k)}) - \text{mean}^{(k)}| \qquad (3)$$

In a step 2006 a cardinality factor card$^{(k)}$=M−|Ĩ$^{(k)}$| may be defined and the left-hand end of the RNS range calculated as $$r^{(k)} = \min(\tilde{I}^{(k)}) - \text{round}\left(\left(1 - \frac{dSx^{(k)}}{|\tilde{I}^{(k)}|}\right) \cdot \text{card}^{(k)}\right) - 1 \quad (4)$$

Such a procedure is exemplified in FIG. 13.

In one or more embodiments the estimated output distribution in $\tilde{v}^{(k)}$ may be exploited in order to select the RNS range.

This range may cover the estimated output range $\tilde{I}^{(k)}$, with margins A and B both to the left and the right of this interval. The available number of values for these margins, card$^{(k)}$ may be distributed to the margins accordingly to the distance of the left and right extreme of $\tilde{I}^{(k)}$ to the mean (average).

Figure 14:
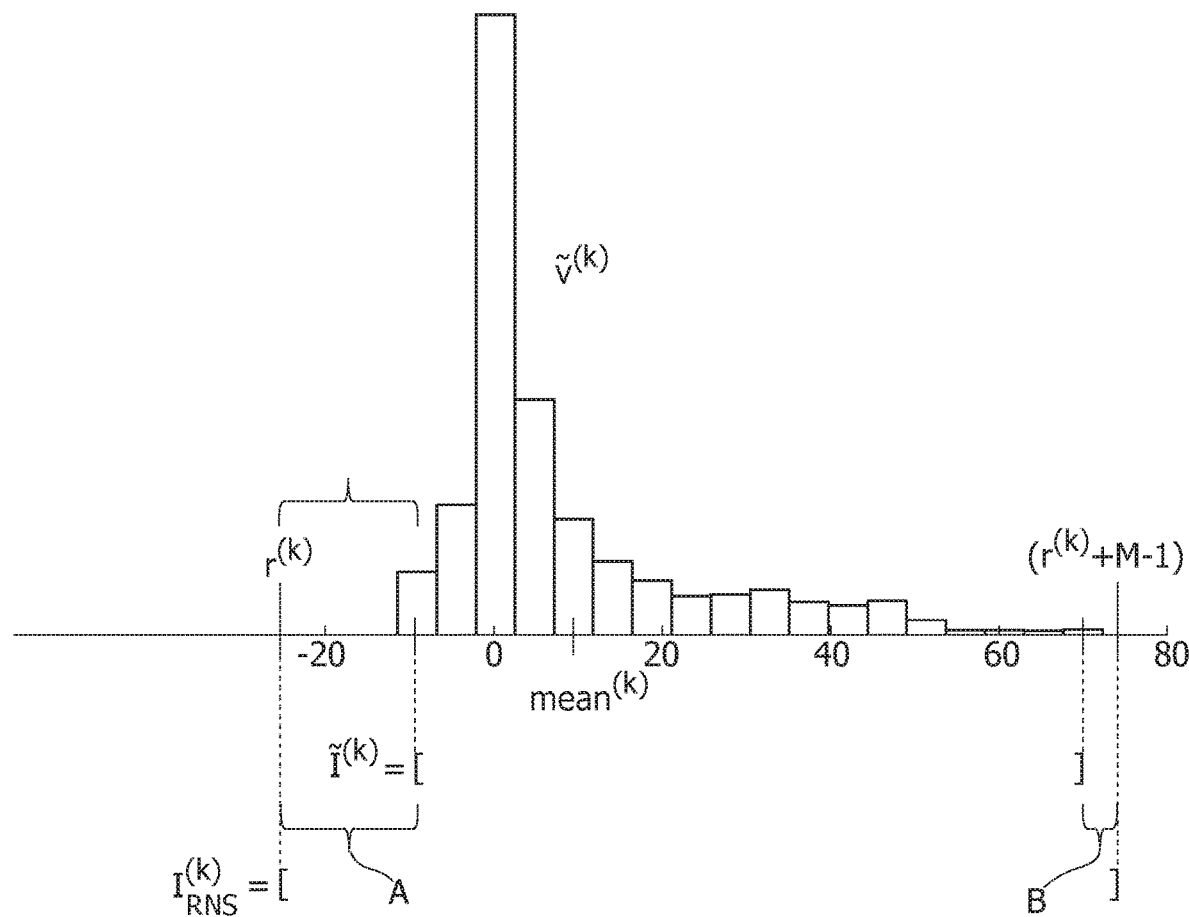
FIG. 14 is illustrative of possible results of the procedure of FIG. 13.

FIG. 14 is exemplary of selection of an RNS range for an estimated output distribution $v^{(k)}$ with f=0:8. The range of values is given by the interval [−9; 70] and the mean is 9.6685. One may assume M=100, thus card$^{(k)}$=20. By using the procedure exemplified herein, $r^{(k)}$=−24.

In one or more embodiments as exemplified herein, in order to be able to process data in the RNS domain in the RNS operation units (e.g., 10 in FIGS. 9 and 10), rounded activations $a_j$ and, possibly, weights $w_j$ may be converted to RNS representation (e.g., at 122 in FIGS. 9 and 10).

Similarly, the results of such processing in such RNS operation units (e.g., 10 in FIGS. 9 and 10) may be converted back into the conventional representation (e.g., at 140 in FIGS. 9 and 10).

From a mathematical viewpoint, the conversion from integer to RNS may be performed, e.g., applying modular reductions, while the Chinese Remainder Theorem may be exploited in reverse (backward) conversion form RNS.

Several approaches and hardware designs for efficient conversion are proposed, e.g., in P. A. Mohan, Residue number systems: algorithms and architectures, vol. 677. Springer Science & Business Media, 2012 (see, e.g., Chapter 2 pp. 26-46 and Chapter 3 pp. 59-88).

In one or more embodiments, operations within RNS blocks (e.g., 10 in FIGS. 9 and 10) may be defined in the Residue Number System.

Various arithmetic operations such as, e.g., additions, subtractions and multiplications may take a simplified form in the RNS, with the results of these operations adapted to be computed by considering separately for each modulus the corresponding residues of the operands.

In one or more embodiments, the operation performed in the "residual" (that is RNS) domain may include a dot product followed by addition of bias.

This kind of operation may involve the following.

Let $w=[w_1, \ldots, w_u]^T$ and $a=[a_1, \ldots, a_u]^T$ be two vectors with integral components.

In one or more embodiments, the RNS representation of $z=w^T a$ may be computed as:

$$z_i = \left|\sum_{j=1}^{u} |w_j|_{m_i} \cdot |a_j|_{m_i}\right|_{m_i} \quad i=1, \ldots, N. \quad (5)$$

Also, in one or more embodiments, computation in a RNS block (e.g., 10 in FIGS. 9 and 10) may include the addition of bias values.

In that case, bias values for the layer k may be multiplied by the product $(\lambda_{act}^{(k)} \cdot \lambda_w^{(k)})$ and then rounded, and the (main) operation performed by a RNS block according to formula (5) above may be slightly modified.

Let b an integer, the RNS representation of $z=w^T a+b$ can be computed as:

$$z_i = \left|\sum_{j=1}^{u} |w_j|_{m_i} \cdot |a_j|_{m_i} + |b|_{m_i}\right|_{m_i} \quad i=1, \ldots, N. \quad (6)$$

As a consequence, one or more embodiments may involve a parallelized implementation for performing computations separately for each modulus.

It may be otherwise observed that computational cost of formulas such as (5) and (6) above derives primarily form the cost for the largest modulus, which in general is much lower than M and thus of the original values.

Algorithms and hardware designs for efficient implementation of arithmetic in the RNS domain are the subject matter of extensive literature: see, e.g., example P. A. Mohan (already cited).

For instance, in one or more embodiments a RNS unit for power-of-2 moduli may include a standard adder (e.g., carry save) or multiplier (e.g., Wallace tree/booth) with a bit width equal to the corresponding base.

The complexity of the resulting circuit may thus be proportional (with a law linear for adders and quadratic for multipliers) to the number of bits, and the resulting HW implementation will be much less complex and faster for RNS units in comparison with conventional units.

It was otherwise observed that for moduli in the form $2^s-1$ the implementation is more complex, requiring wider multipliers and end-carry adders for the modulo arithmetic.

The following Table reports a set of experimental results for area, power and timing for standard MAC units with 16-bits of precision and three different RNS representations with basis 3 and 4. These results were obtained with a Synopsys dc compiler with front-end synthesis in FD-SO128 nm at 1.1V and 125 C (DesignWare was used for the multipliers and adder blocks) with a pure combinatorial design. Each column is split into 2 subcolumns that contain the actual values and the increase factors respectively.

While these results do not account for integer-to-RNS and back conversion, those costs may be "averaged down" by creating parallel HW units to process multiple MACs from kernel convolutions and accumulating them before converting back the results.

| configuration | Area | | Normalized power (@ 1 GHz) | | Timing | |
|---|---|---|---|---|---|---|
| (constr @ 2 ns) | um2 | ratio | mW | ratio | ns | ratio |
| MAC(16, 16)−>32 | 800.00 | 1.00 | 0.64 | 1.00 | 1.61 | 1.00 |
| (2, 255, 127) | 399.18 | 2.00 | 0.21 | 3.02 | 1.07 | 1.50 |
| (128, 31, 15) | 234.19 | 3.42 | 0.08 | 7.69 | 0.67 | 2.40 |
| (64, 31, 7, 3) | 199.43 | 4.01 | 0.07 | 9.60 | 0.67 | 2.40 |
| (8, 127, 63) | 316.00 | 2.53 | 0.15 | 4.20 | 1.10 | 1.46 |
| Pipelined configuration | Area | | Power (@ 0.7 ns(1.4 GHz) | | Timing | |
| (constr @ 0.6 ns) | um2 | ratio | mW | ratio | ns | ratio |
| MAC(16, 16)−>32 | 926.32 | 1.00 | 1.72 | 1.00 | 0.60 | 1.00 |
| (2, 255, 127) | 534.00 | 1.73 | 0.89 | 1.93 | 0.60 | 1.00 |

-continued

| | | | | | |
|---|---|---|---|---|---|
| (128, 31, 15) | 273.36 | 3.39 | 0.35 | 4.95 | 0.60 | 1.00 |
| (64, 31, 7, 3) | 236.15 | 3.92 | 0.29 | 5.92 | 0.60 | 1.00 |
| (8, 127, 63) | 379.00 | 2.44 | 0.66 | 2.63 | 0.60 | 1.00 |

It was observed that the choice of the set of moduli may play a significant role. In fact, the moduli are responsible of the range width. Moreover, a judicious choice of the base may lead to advantages in terms of computation or storage efficiency and simplification of some operations.

In general, in one or more embodiments, possible aims directing the choice of the moduli may include:
increasing (maximizing) the range,
reducing execution time of the operations,
increasing (maximizing) storage efficiency, considering that the residuals would be coded in some binary code.

A possible way of increasing the range may include using moduli that are (pairwise) mutually prime. This result may be facilitated, e.g., by strategies for choosing the moduli including, e.g.:
a large number of small coprime moduli,
a set of coprime moduli of the form $2^s$, $(2^s-1)$.

The former strategy facilitates reducing the execution time of additions and multiplications, which given primarily by the execution time of additions and multiplications of residues corresponding to the largest modulus. On the other side, this strategy may increase the time for conversion from residue number system to the associated mixed-radix system (see, e.g., I. Koren, Computer arithmetic algorithms, Chapter 11, pp. 264-265, Universities Press, 2002) and does not maximize the storage efficiency.

The latter strategy facilitates efficient storage and simplifies the execution of some arithmetic operations such as additions and subtractions. In fact the smallest number of bits needed to represent the residue digits for the modulus $m_i$ is $\lceil \log_2 m_i \rceil$.

Thus, representation storage efficiency may be increased by select a modulus $m_i$ that is equal to $2^s$ for some s or very close to it, such as $(2^s-1)$. This strategy may be also useful for operation simplifications. For example, for moduli of the form $2^s$, addition may be performed with an ordinary binary adder, and the additive inverse of a number is simply the complement-to-2 thereof. For a modulus $(2^s-1)$, modular reduction may be further simplified, and addition may become an adder with end-around carry, with the additive inverse of a number being the complement-to-1 thereof. In that way, no modular reductions may be involved for additions and subtractions.

Performance of embodiments was evaluated, e.g., in the contest of a CNN such as AlexNet (discussed previously).

For experimental purposes a MATLAB replica of forward propagation of AlexNet was adopted using the version of the network provided by the Caffe Model Zoo (http://caffe.berkeleyvision.org/model_zoo.html) for which trained weights are available.

An analysis of the distributions of values which would be treated in RNS representation was performed in particular with reference to the distribution of inputs and outputs to RNS blocks—performing the forward propagation on the original network with 200 random validation images—along with the distribution of weights. Based on the values obtained values, the resolution of the network as set to n=16 bits, by setting the RNS base to $(2^3; 2^6-1; 2^7-1)$, which provides M=64008.

Also, it was verified that setting $\lambda_{act}^{(k)}=1$ for k=1, ..., L:=8 does not appreciably affect network accuracy.

Further testing involved the procedure for tuning of the remaining parameters, starting from the scale factors for the weights, $\lambda_w^{(k)}$ for k=1, ..., 8—for which the network may be particularly sensitive, and then selecting consequently the RNS range for each block. The final values are reported in the table below which for the first and second convolutional layers conveys the outcome of tests made for selecting a best value for the scale factor.

| layer | $\lambda_w^{(k)}$ | $-r^{(k)}$ |
|---|---|---|
| conv1 | 39 | 32112 |
| conv2 | 86 | 31988 |
| conv3 | 55 | 33050 |
| conv4 | 93 | 31209 |
| conv5 | 112 | 30032 |
| fc6 | 273 | 38262 |
| fc7 | 1047 | 32132 |
| fc8 | 1083 | 23296 |

The impact of one or more embodiments on the performance of AlexNet over the entire validation set are reported in the further table below, which refer to the exemplary procedure discussed herein was experimented with the additional condition of considering the scale factors as powers of 2. This choice further facilitates simplifying the division by the scale factors at the end of the residual blocks in view of an optimized hardware implementation. The same resolution and RNS base were maintained and with tuning of the scale factors $\lambda_w^{(k)}$ for k=1; ...; 8 partly modified.

| layer | $\lambda_w^{(k)}$ | $-r^{(k)}$ |
|---|---|---|
| conv1 | 32 | 31489 |
| conv2 | 64 | 37730 |
| conv3 | 64 | 33081 |
| conv4 | 64 | 32429 |
| conv5 | 64 | 33993 |
| fc6 | 256 | 37643 |
| fc7 | 1024 | 32246 |
| fc8 | 1024 | 24562 |

The following table summarizes by way of direct comparison results obtainable with one or more embodiments, including the variation discussed above.

| | residual AlexNet | residual AlexNet (variation) | original AlexNet |
|---|---|---|---|
| top5(%) | 75.09 | 76.24 | 79.12 |
| top1(%) | 51.33 | 52.60 | 55.78 |

Figure 15:
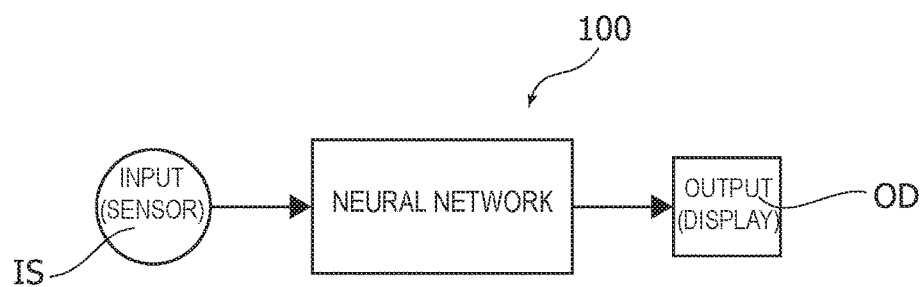
FIG. 15 is generally illustrative of apparatus which may include embodiments.

The block diagram of FIG. 15 is exemplary of apparatus which may include a neural network 100 according to one or more embodiments.

Such apparatus may include an input element or device IS, e.g., a sensor such as a microphone, a (video) camera, a biomedical sensor, and the like, providing input signals to be processed by a neural network 100 according to one or more embodiments. The neural network 100 may be configured as discussed previously to perform on the input signals from the device IS processing tasks such as, e.g., acoustic scene classification, sensor-based activity recognition, classification of heartbeats and facial emotion recognition (these are just example of course) and provide corresponding results to an output device OD such as, e.g., a display unit, a warning system, a "networked" device, e.g., in an Internet-of-Things (IoT) scenario.

By way of comparison, certain conventional solutions may adopt a 48-bit representation for weights and activations (this may represent a maximum value for a conventional implementation), with corresponding 103-bit accumulators (for 11×11 convolutional filters). This may correspond to a RNS representation using a number of bits in excess of 103. Absent steps allowing a reduction in accumulator resolution, a loss in network accuracy would be unavoidable.

By way of contrast, one or more embodiments may admit a reduced representation for accumulators.

For instance, tests as discussed in the foregoing may start from a 32-bit representation for weights which, without loss of information as in conventional approaches, would require 71-bit accumulators. One or more embodiments may adopt 16-bit RNS accumulators by minimally affecting network accuracy. In one or more embodiments this may be made possible by using scale factors as discussed previously.

One or more embodiments may thus relate to an operating method of neural networks including a plurality of network layers (e.g., an input layer IL, an output layer OL and at least one intermediate ("hidden") layer HL between the input layer and the output layer) including operating units performing (low-precision) arithmetic operations on input data (e.g., $a^{(k-1)}$, $w^{(k)}$) to provide output data (e.g., $a^{(k)}$), wherein the method includes:

selecting a set of operating units (see, e.g., conv, fc, inception in FIGS. 6 to 8) in the network layers, and performing arithmetic operations in operating units (see, e.g., 10 in FIGS. 9 and 10) in said selected set of operating units by performing operations in a Residue Number System (briefly, RNS) on RNS-converted (see, e.g., 12; 16) input data by obtaining RNS output data in the Residue Number System, backward converting (see, e.g., 14) from the Residue Number System the RNS output data resulting from the RNS operations.

In one or more embodiments, the set of selected operating units may include operating units performing operations selected out of multiplication, including dot product and matrix multiplication, additions and subtractions.

In one or more embodiments, the set of selected operating units may include operating units performing operations (for instance dot products) homogeneous with respect to a first set and a second set of input data (e.g., activations $a^{(k-1)}$ and weights $w^{(k)}$) and the method may include:

providing the RNS-converted input data by forward converting to a Residue Number System both said first set and said second set of input data (see, e.g., 12 in FIG. 9); or providing the first set of input data by forward converting to a Residue Number System said first set of input data (see, e.g., 12 in FIG. 10) and providing the second set of input data as a stored set (16) of RNS-converted input data (see, e.g., 16 in FIG. 10).

In one or more embodiments, the RNS-converted input data may include data scaled (e.g., at 120) by respective scale factors, wherein backward converting (e.g., 14) from the Residue Number System includes complementary re-scaling (e.g., 142) of the RNS output data resulting from the RNS operations by respective complementary scale factors.

In one or more embodiments, the RNS-converted input data may include integer-to-RNS converted data (e.g., 122), wherein backward converting from the Residue Number System may includes RNS-to-integer conversion (e.g., 140) of the RNS output data resulting from the RNS operations.

In one or more embodiments:

the RNS-converted input data may include data scaled by respective scale factors and rounded to be integer-to-RNS converted, and backward converting from the Residue Number System may include RNS-to-integer conversion and complementary re-scaling by respective complementary scale factors of the RNS output data resulting from the RNS operations.

One or more embodiments may include one or more of:

using a same set of scale factors for RNS-converted input data in a plurality of arithmetic operations in the Residue Number System RNS (thus avoiding re-calculating them), and/or setting to unity the scale factors for at least a part of said RNS-converted input data, and/or the scale factors for RNS-converted input data may include power-of-two scale factors, wherein scaling includes shifting of binary data.

One or more embodiments may include performing (10) arithmetic operations in a Residue Number System RNS with power-of-two moduli.

One or more embodiments may concern a neural network including a plurality of layers (e.g., IL, HL, OL) including operating units performing arithmetic operations on input data to provide output data, the network including units configured (see, e.g., 12, 10, 14 in FIGS. 9 and 10) for operating in a Residue Number System (briefly, RNS) by performing RNS operations on RNS-converted input data with the method of one or more embodiments.

One or more embodiments may concern apparatus including, a source device (e.g., as exemplified at the outset of this description) providing data for processing by a neural network, a neural network (e.g., 100) according to one or more embodiments, the neural network coupled to the source device (IS) and configured for receiving said data from the source device, providing neural network processing of said data and outputting output data (e.g., OD) resulting from neural network processing of said data in the neural network.

One or more embodiments may concern a computer program product loadable the memory of at least one processing device and including software code portions for executing the steps of the method of one or more embodiments when the product is run on at least one processing device.

Without prejudice to the underlying principles, the details and embodiments may vary, even significantly, with respect to what has been described in the foregoing by way of example only, without departing from the extent of protection.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, RNS circuitry, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   scaling, using a set of operating circuits of a neural network, input data to the set of operating circuits using input scaling factors;
   converting, using the set of operating circuits of the neural network, the scaled input data to the set of operating circuits of the neural network to a Residual Number System (RNS) domain from one or more other domains, the neural network having a plurality of layers;
   performing arithmetic operations in the set of operating circuits in the RNS domain on the converted data;
   converting, using the set of operating circuits of the neural network, output results of the arithmetic operations of the set of operating circuits from the RNS domain to the one or more other domains;
   scaling the converted output results in the one or more other domains using output scaling factors complementary to the input scaling factors, generating scaled output results, wherein the input scaling factors are selected to determining a range of represented values in the RNS domain; and
   performing a classification operation based on the scaled output results.

2. The method of claim 1, comprising:
   receiving at least some of the input data from one or more sensors; and
   generating one or more control signals based on results of the classification operation.

3. The method of claim 2 wherein the one or more control signals include:
   control parameters;
   control signals;
   model parameters;
   warning signals; or
   combinations thereof.

4. The method of claim 1, comprising:
   selecting the set of operating circuits.

5. The method of claim 1 wherein the set of operating circuits perform arithmetic operations selected out of multiplications, additions and subtractions.

6. The method of claim 1 wherein the set of operating circuits includes operating circuits performing operations homogeneous with respect to a first set and a second set of input data, the method including converting both said first set and said second set of input data to the RNS domain.

7. The method of claim 1 wherein the set of operating circuits includes operating circuits performing operations homogeneous with respect to a first set and a second set of input data, the method including:
   converting the first set of input data to the RNS domain; and
   retrieving the second set of input data from a memory.

8. The method of claim 1, comprising:
   setting input scaling factors and output scaling factors for each layer of the plurality of layers.

9. The method of claim 1 wherein the one or more other domains includes an integer domain.

10. The method of claim 1, comprising:
    rounding scaled input data prior to converting the scaled input data to the RNS domain.

11. The method of claim 1, comprising:
    using a same set of scaling factors for a plurality of the set of operating circuits;
    setting to unity scaling factors for at least a part of the set of operating circuits;
    using a power-of-two scaling factor for at least one of the set of operating circuits, wherein scaling includes shifting of binary data; or
    combinations thereof.

12. The method of claim 1, comprising setting the respective scaling factors using a look-up-table.

13. The method of claim 1, including performing at least one arithmetic operation in a RNS domain with power-of-two moduli.

14. A neural network, comprising:
    one or more inputs, which, in operation, receive input data;
    one or more outputs, which, in operation, output one or more output signals; and
    a plurality of network layers coupled between the one or more inputs and the one or more outputs, and which, in operation, perform classification operations, the performing including generating the one or more output signals based on the input data, the plurality of network layers including a set of operating circuits, which, in operation:
    scale respective sets of data using input scaling factors;
    convert scaled sets of data to a Residual Number System (RNS) domain from one or more other domains, wherein input scaling factors applied to a set of data determine a range of the RNS domain;
    perform arithmetic operations in the RNS domain on the converted data;
    convert respective results of the arithmetic operations from the RNS domain to the one or more other domains; and
    scale the converted results using output scaling factors complementary to the input scaling factors.

15. The neural network of claim 14 wherein,
    the input data comprises sensor data; and
    the output signals comprise control signals.

16. The neural network of claim 14 wherein the neural network, in operation, selects the set of operating circuits.

17. The neural network of claim 16 wherein the set of operating circuits, in operation, perform arithmetic operations selected out of multiplications, additions and subtractions.

18. The neural network of claim 14 wherein at least some of the set of operating circuits, in operation:

set input scaling factors and output scaling factors for each layer of the plurality of layers.

19. The neural network of claim 14 wherein the set of operating circuits, in operation, round at least some of the scaled input data prior to converting the at least some of the scaled input data to the RNS domain.

20. A system, comprising:
circuitry, which, in operation, generates source data; and
a neural network coupled to the circuitry, wherein the neural network, in operation, performs classification operations, the performing classification operations including generating one or more output signals based on the source data and including a set of operating circuits, wherein the operating circuits, in operation:
scale respective sets of data using input scaling factors;
convert scaled sets of data to a Residual Number System (RNS) domain from one or more other domains, wherein input scaling factors applied to a set of data determine a range of the RNS domain;
perform arithmetic operations in the RNS domain on the converted data; and
convert respective results of the arithmetic operations from the RNS domain to the one or more other domains; and
scale the converted results using output scaling factors complementary to the input scaling factors.

21. The system of claim 20 wherein,
the circuitry comprises one or more sensors; and
the output signals comprise control signals.

22. The system of claim 20 wherein at least some of the set of operating circuits, in operation:
set input scaling factors and output scaling factors for each layer of the plurality of layers.

23. The system of claim 20 wherein the set of operating circuits, in operation, round at least some of the scaled input data prior to converting the at least some of the scaled input data to the RNS domain.

24. A non-transitory computer-readable medium whose contents configure a set of operating circuits of a neural network having a plurality of layers to perform a method, the method comprising:

scaling input data to the set of operating circuits using input scaling factors;
converting scaled input data to the set of operating circuits of the neural network to a Residual Number System (RNS) domain from one or more other domains, the input scaling factors determining a range of represented values in the RNS domain;
performing arithmetic operations in the set of operating circuits in the RNS domain on the converted data;
converting output results of the arithmetic operations of the set of operating circuits from the RNS domain to the one or more other domains;
scaling the converted output results in the one or more other domains using output scaling factors complementary to the input scaling factors, generating scaled output results; and
performing a classification operation based on the scaled output results.

25. The non-transitory computer-readable medium of claim 24 wherein the method comprises:
receiving at least some of the input data from one or more sensors; and
generating one or more control signals based on the converted output results.

26. The non-transitory computer-readable medium of claim 25 wherein the method comprises:
selecting the set of operating circuits.

27. The non-transitory computer-readable medium of claim 24 wherein the method comprises:
setting input scaling factors and output scaling factors for each layer of the plurality of layers.

28. The non-transitory computer-readable medium of claim 24 wherein the method comprises:
rounding at least some of the scaled input data prior to converting the at least some of the scaled input data to the RNS domain.

* * * * *

UNITED STATES PATENT AND TRADEMARK OFFICE
CERTIFICATE OF CORRECTION

PATENT NO. : 11,308,406 B2
APPLICATION NO. : 15/877138
DATED : April 19, 2022
INVENTOR(S) : Valentina Arrigoni et al.

It is certified that error appears in the above-identified patent and that said Letters Patent is hereby corrected as shown below:

In the Claims

Column 23, Claim 20, Line 20:
"converted data; and" should read: --converted data;--.

Signed and Sealed this
Twelfth Day of July, 2022

Katherine Kelly Vidal
*Director of the United States Patent and Trademark Office*